(12) United States Patent
John et al.

(10) Patent No.: US 11,458,672 B2
(45) Date of Patent: Oct. 4, 2022

(54) METHOD AND DEVICE FOR BUILDING A SHAPED BODY BY STEREOLITHOGRAPHIC SOLIDIFICATION OF BUILDING MATERIAL BY PHOTOPOLYMERIZATION

(71) Applicant: Ivoclar Vivadent AG, Schaan (LI)

(72) Inventors: Hendrik John, Buchs SG (CH); Rebecca Russ, Biberach (DE)

(73) Assignee: Ivoclar Vivadent AG, Schaan (LI)

( * ) Notice: Subject to any disclaimer, the term of this patent is extended or adjusted under 35 U.S.C. 154(b) by 39 days.

(21) Appl. No.: 16/589,431

(22) Filed: Oct. 1, 2019

(65) Prior Publication Data
US 2020/0108549 A1   Apr. 9, 2020
US 2022/0258408 A9   Aug. 18, 2022

(30) Foreign Application Priority Data
Oct. 24, 2018   (EP) .................... 18202252

(51) Int. Cl.
| B29C 64/245 | (2017.01) |
| B29C 64/124 | (2017.01) |
| B29C 64/357 | (2017.01) |
| B29C 64/232 | (2017.01) |
| B29C 64/255 | (2017.01) |
| B29C 64/241 | (2017.01) |
| B29C 64/35  | (2017.01) |

(52) U.S. Cl.
CPC .......... *B29C 64/124* (2017.08); *B29C 64/232* (2017.08); *B29C 64/241* (2017.08); *B29C 64/245* (2017.08); *B29C 64/255* (2017.08); *B29C 64/35* (2017.08); *B29C 64/357* (2017.08)

(58) Field of Classification Search
CPC .......................... B29C 64/245; B29C 64/255
See application file for complete search history.

(56) References Cited

U.S. PATENT DOCUMENTS

| 5,122,441 A       | 6/1992  | Lawton et al. |
| 8,623,264 B2      | 1/2014  | Rohner et al. |
| 9,067,359 B2      | 6/2015  | Rohner et al. |
| 2011/0049767 A1 * | 3/2011  | Schlienger ............. B33Y 40/00 264/401 |
| 2011/0310370 A1   | 12/2011 | Rohner et al. |
| 2013/0295212 A1 * | 11/2013 | Chen ..................... B29C 64/129 425/150 |
| 2014/0044824 A1   | 2/2014  | Rohner et al. |

(Continued)

FOREIGN PATENT DOCUMENTS

| EP | 3354442 A1 * | 8/2018 | ........... B29C 64/255 |
| EP | 3354442 A1   | 8/2018 | |

(Continued)

OTHER PUBLICATIONS

Chu et al, Superamphiphobic surfaces, 2014, Chemical Society Reviews, 43, 2784-2798 (Year: 2014).*

(Continued)

*Primary Examiner* — Timothy Kennedy
(74) *Attorney, Agent, or Firm* — Ann M. Knab; Thad McMurray

(57) ABSTRACT

The present invention is directed to a method and a device for building a shaped body by stereolithographic solidification of building material by photopolymerization.

8 Claims, 8 Drawing Sheets

(56) References Cited

U.S. PATENT DOCUMENTS

| | | |
|---|---|---|
| 2015/0034007 A1 | 2/2015 | Fischer et al. |
| 2015/0360419 A1 | 12/2015 | Belz et al. |
| 2016/0303795 A1 | 10/2016 | Liu et al. |
| 2017/0151718 A1 | 6/2017 | Rolland et al. |

FOREIGN PATENT DOCUMENTS

| | | |
|---|---|---|
| EP | 3643479 B1 | 1/2021 |
| TW | I 630090 B | 7/2018 |
| WO | 2018114655 A1 | 6/2018 |

OTHER PUBLICATIONS

Yuan et al, Optimization of Amphiphobic Structural Surface Thickness in Relation to its Functionality on Stainless Steel Plates, 2014, Journal of Applied Polymer Science, vol. 131, issue 21 (Year: 2014).*

* cited by examiner

METHOD AND DEVICE FOR BUILDING A SHAPED BODY BY STEREOLITHOGRAPHIC SOLIDIFICATION OF BUILDING MATERIAL BY PHOTOPOLYMERIZATION

CROSS-REFERENCE TO RELATED APPLICATIONS

This application claims priority to European patent application No. 18202252.5 filed on Oct. 24, 2018, the disclosure of which is incorporated herein by reference in its entirety.

TECHNICAL FIELD

The present invention is directed to a method for building a shaped body by stereolithographic solidification of building material by photopolymerization.

SUMMARY

In the method herein, building material is conveyed between a building platform and a transparent bottom plate and is exposed in a spatially selective manner through the bottom plate in order to solidify building material above the bottom plate within a predetermined contour;
the building platform is lifted relative to the bottom plate, and building material is replenished; and
these two steps are continued until the shaped body is built by spatially selectively solidified building material.

The layer-wise or continuous building processes of shaped bodies belong to the production processes which fall under the generic term generative manufacturing or additive manufacturing. This is understood as a class of methods in which a three dimensional object (shaped body) is directly built based on a digital model of the shaped body (for example a CAD model). For this purpose, in case of layer-wise building, the digital model of the shaped body is subdivided into a plurality of subsequent thin slices, wherein each slice has a contour defined by the model. The building process is performed by adding material layers, wherein each layer is processed such that for this layer the contour is generated which is specified by the model. Eventually the pile of slices lying on top of each other and being connected to each other forms the shaped body which in some methods is processed further, for example by heat application for debinding and sintering. The term "contour" is used in the context of the present invention in a general sense and is not limited to a simple, closed boundary line which encloses a simply connected area, but may also comprise several separate contour sections which enclose adjacent separate areas which together form the respective slice, or there may be outer and inner contour sections which define annular areas of the slice.

The present invention is directed to additive manufacturing of shaped bodies, wherein building material is spatially selectively exposed for solidifying it by photopolymerization. The building material may have a broad range of viscosities from being flowable to not flowable, and may include besides photopolymerizable monomer compounds fillers such as ceramic, glass ceramic or metal powder, and optionally dispersing media and other additives. The present invention is in particular directed to the manufacturing of ceramic and glass ceramic shaped bodies (so called green bodies), such as dental inlays, onlays, veneers, crowns, bridges and frameworks.

WO 2010/045950 A1 and corresponding U.S. 2011310370, U.S. 2014044824, U.S. Pat. Nos. 8,623,264, 9,067,359, which US published applications and patents are hereby incorporated by reference in entirety, are directed to a method for generating a shaped body, which method is directed in particular to the generation of dental restorations from ceramic slurries which comprise a liquid, photopolymerizable component and a filler of ceramic or glass ceramic powder distributed therein. In this prior art method the shaped body is built up successively by layers solidified on top of each other. In this method a building platform is held vertically moveable above a tank bottom which is at least in the building area transparent. Below the tank bottom an exposure unit is located. The building platform is first lowered into the slurry in the tank down to a level at which a layer having the desired layer thickness remains between the building platform and the tank bottom. Thereafter this layer is exposed within the contour prescribed for this layer by the digital model, and is thereby solidified. After lifting the building platform up slurry is replenished, for example using a doctor blade, and then the building platform is lowered again into the slurry, wherein the lowering is controlled in such a manner that the distance between the last solidified layer and the tank bottom defines a layer of building material having the desired thickness. The last two steps are repeated so many times until the shaped body has been built with the desired three dimensional shapes by the successive solidification of layers, for each layer within the contour prescribed by the digital model.

The exposure unit is configured for exposing a large number of picture elements which are arranged in an array in an exposure field. The exposure unit comprises for example a light source and a spatial light modulator. The active surface of the spatial light modulator comprises an array or a matrix of exposing elements, wherein each exposing element is associated with one picture element in the exposure field of the exposure unit. The spatial light modulator can for example be a so called micromirror device or digital mirror device (DMD). Such device is known to be a chip provided with a large number of micromirror actuators arranged in an array. Each micromirror actuator is individually and selectively controllable by a control unit to be selectively tiltable between an exposure position in which the micromirror reflects light from the light source to the associated picture element, and a dark position in which the micromirror deflects the light into an inactive area. By switching the micromirror back and forth using a duty cycle which is selectively defined for each exposing element the generated exposure intensity for the associated picture element can be set as average intensity determined by the duty cycle. The exposure unit equipped with a DMD is also referred to as DLP unit (digital light processing). Another example for a spatial light modulator comprises a liquid crystal display which is trans-illuminated by a light source and which is subdivided into a matrix arrangement of large number of individual exposing elements, each of which being assigned to a picture element.

After the shaped body has been built up the building platform can be taken out together with the shaped body. In many cases further treatment steps follow. In the method described above, the layer-wise polymerization of building material results in a green body. This is then exposed to high temperatures in order to remove the binder, in this case the photopolymer. This takes place at high temperatures by thermal decomposition and reactions which decompose the polymer into lower mass molecules which by diffusion move to the surface of the body and eventually escape as gases. Subsequent to this process of debinding a further temperature treatment can follow for further densification, wherein the remaining ceramic particles in the shaped body are sintered.

The known method has disadvantages because only flowable building materials of relatively low viscosity (<10 Pas) can be processed. A tank open at the top for receiving the building material with a correspondingly large building platform occupies a large footprint for the overall system. Furthermore, a tank open at the top holding the building material is useable rather in laboratory environments only, but is in any case not well suited for operation for example in dental practices because in such practices it has to be ensured that the personnel is dealing with a preferably "dry" and simple process in which the personnel ideally does not come in contact with unreacted building material (monomer).

The present invention aims in particular at the capability of being able to process building materials of high viscosity which are not flowable. Building materials which include a high amount of fillers, for example in form of ceramic powder, may have a very high viscosity and may be not flowable. For such materials the replenishment of building material to the building area in the tank below the building platform is problematic since, even if a doctor blade is used, failure-free supply of highly viscous building material on the tank bottom to the building area is technically complex.

A further disadvantage is that, when a tank with building material is used, changing between different building material compositions during the building process is very difficult, in any case highly complex since for this purpose a plurality of tanks with different building material compositions have to be moveable to be positioned under the building platform. Very difficult is the realization of gradual, continuous transitions between building material compositions, for example the realization of colour transitions in the shaped body.

It is an object of the present invention to define a method for building up of shaped bodies by successive solidification of building material by stereolithographic photopolymerization, which method may be performed with low space requirements and with operational safety such that it can also be safely performed in surroundings where personnel without specific training is present.

This object is achieved by the method having the features of the claims. Preferred embodiments of the method are set out in the subclaims. A device for carrying out the method is defined in the claims, and preferred embodiments of the device are set out in the subclaims.

According to the present invention the building platform is formed by a front face of a piston which is slideably guided in a cylinder. An open end face or end plane of the cylinder which is facing the front face of the piston is closed by the bottom plate such that piston, cylinder and bottom plate form a closed chamber inside the cylinder as a building space. Further building material is replenished by moving the piston away from the bottom plate and by simultaneously conveying building material through a supply line which leads to and opens out into the interior of the cylinder, to fill the extra space created by the movement of the piston away from the bottom plate with building material. Preferably, the supply line opens out into the interior of the cylinder adjacent to the bottom plate.

The method according to the invention has a number of advantages. The method can be carried out using a very compact device structure since there are no portions of a tank which are laterally extending beyond the actual building area. Instead only a cylinder is required in which the building platform is guided as a shiftable piston. The open end face of the cylinder facing the piston is closed by the bottom plate. The piston is moved away from the bottom plate such that the building space enclosed by cylinder, bottom plate and piston grows together with the growing shaped body during the building process.

A further advantage is that there is no free access to building material in an open tank but the building material is contained in a closed building space defined by the cylinder, the piston and the base plate such that there is no danger that operating personnel could come into contact with building material. In addition, the building material is used in a very efficient manner since only as much building material is replenished in the building space growing during the building process as is needed for the building height of the shaped body.

In principle the method can be performed continuously, i.e. the piston is continuously moved away from the bottom plate (at a speed at which the shaped body grows). Simultaneously building material is continuously replenished in order to keep the building space in the interior of the cylinder filled, and the exposure unit exposes continuously, namely in a manner comparable to a video with a rapid succession of video frames, such that the contour currently to be solidified is continuously adjusted according to the digital model of the shaped body.

Among the stereolithographic building methods, however, methods are more common which operate in a step- or layer-wise fashion. In a preferred embodiment the method of the present invention is carried out as a layer-wise building method. At the beginning of the building process a first layer of building material is formed between the piston and the bottom plate which are set at a distance of a desired layer thickness to each other, by filling up the gap between the bottom plate and the piston, and by exposing the layer created in this manner through the bottom plate in a spatially selective manner in order to solidify a layer area with a contour as prescribed for this layer by the digital model of the shaped body, and to fix the solidified area to the piston. Thereafter the piston is moved further away from the bottom plate by a layer thickness and building material is simultaneously replenished of to form a further layer between the last solidified layer and the bottom plate. The further layer is exposed through the bottom plate in a spatially selective manner in order to solidify a layer area within a contour as described for the respective layer by the digital model. The two last mentioned steps are repeated as often as necessary until the shaped body is built up by layer areas solidified on top of each other. During the building process a further layer of building material is formed by moving the piston a distance corresponding to the desired layer thickness further away from the bottom plate and by simultaneously replenishing building material by feeding it through the supply line in order to fill the growing volume resulting from the movement of the piston away from the bottom plate with building material.

Insofar as the bottom plate is designated as "transparent" in the present description, this is intended to mean that it is possible to carry out a spatially selective exposure through the bottom plate which means that the bottom plate is translucent and which does not exclude that a certain amount of the incoming radiation is absorbed in the bottom plate or scattered therein.

In a preferred embodiment the piston is, during the movement in the cylinder away from the bottom plate, simultaneously rotated about a rotational axis coinciding with the longitudinal axis of the cylinder such that points on the outer circumference of the piston perform a spiral or helical movement. This has the effect that during the movement of the piston away from the bottom plate this linear movement away from the bottom plate is superimposed on a movement component transverse to the bottom plate, which transverse moving component facilitates the separation from the bottom plate. In a layer-wise method this means that after solidifying a layer, when the piston is moved in a direction away from the bottom plate, the movement during lifting off the last solidified layer is not a movement strictly perpendicular to the bottom plate but, by simultaneously rotating the piston, includes also a movement component transverse to the bottom plate. This movement supports the separation of the last solidified layer from the bottom plate. Further preferred means for preventing adherence of the solidified layers to the bottom plate and thereby for supporting separation will be explained further below.

Preferably the movement of the piston is effected by a drive motor, wherein a rotating movement of the piston is at the same time translated into the linear movement of the piston away from the bottom plate, e.g. by a spindle drive. This may for example be accomplished by forming at least part of a piston rod as a threaded rod which is received in an internal thread which is stationary with respect to the cylinder, wherein the drive motors rotates the piston rod which, as a spindle, then at the same time effects the longitudinal movement and the rotating movement of the piston. The internal thread may for example be formed in the inner wall of central opening in an intermediate wall parallel to the bottom plate or in a cover of the cylinder, wherein beyond the intermediate wall the drive motor and further components for operation may be accommodated. The threaded rod may then be rotated in this internal thread in the cover by the drive motor such that by the spindle drive a linear movement of the piston in addition to the rotating movement is effected. In this case the component with the internal thread which is engaged by the external thread of the threaded rod has to be fixed relative to the cylinder during the building process so that the rotation of the threaded rod in the internal thread is translated into defined movement of the piston relative to cylinder. The fixation of this component should be releasable so that after completion of the building process and after release of the fixation the component with the internal thread can be taken out together with the threaded rod and the piston having the built shaped body hanging thereon, wherein the component with the internal thread (for example a cylinder cover) remains in engagement on the external thread of the threaded rod like a nut.

In a preferred embodiment the building material is held available in a cartridge which is connected to the supply line of the cylinder, wherein building material in the cartridge is conveyed through the supply line into the cylinder by driving a cartridge piston in a controlled manner to press building material out of the cartridge into the cylinder. The movement of the cartridge piston may be driven in a controlled manner, for example hydraulically, pneumatically or by step motor.

In a preferred embodiment a plurality of building material compositions is held available, and under the control of a control unit, selectively one or more of the building material compositions is or are conveyed into the cylinder. There may be for example a plurality of cartridges, each of which being connected to a supply line to the cylinder, wherein the control unit selectively drives one or more of the cartridges holding the respectively desired building material compositions to convey material into the cylinder. In principle it is also possible that a number of cartridges are connected to a collecting pipe which then leads as a supply line to the interior of the cylinder.

In a preferred embodiment, after the building process of a shaped body has been completed, unused or surplus building material (unpolymerized building material) is, by means of pressurized air, pressed out of the building space enclosed in the interior of the cylinder, preferably back into the associated cartridge.

In a preferred embodiment, after removal of the unused building material, cleaning liquid is directed into the cylinder in order to purge the shaped body of building material residues possibly still sticking on the shaped body.

An input port for pressurized air and cleaning liquid may be located in an upper section of the cylinder, wherein this input port is unblocked or opened by moving the piston past the area of the input port such that the input port then opens out into the interior of the cylinder. Not solidified building material, if there is only one building material component present, is pressed by the pressurized air back again into the respective cartridge. In case several building material compositions are present they are collectively disposed. For discharging the cleaning liquid a separate opening similar to the building material supply line is provided as an outlet directly above the bottom plate. In this manner the cleaning liquid could for example be circulated to flush the building space which leads to an improved cleaning effect of the shaped body.

Thereafter the shaped body can be subjected to further processing steps, for example debinding and sintering.

A device for carrying out the method according to the invention is characterized by a cylinder, wherein one of the end planes of the cylinder is closed by a bottom plate which is at least in a central area transparent, and wherein in the cylinder a piston is guided to be displaceable by a drive motor in the longitudinal direction of the cylinder, such that the cylinder, the piston and the bottom plate define a closed building space having a variable volume in the interior of the cylinder, a container holding building material and being connected to a supply line which opens into the interior of the cylinder adjacent to the inner surface of the bottom plate, and a conveying device for conveying building material from the container through the supply line into the interior of the cylinder, an exposure unit which is configured for spatially selective exposure through the bottom plate, and a control unit which is arranged to control the drive motor of the piston and the conveying device so as to fill the additional space created by the movement of the piston away from the bottom plate with building material, and which is arranged to control the exposure unit for spatially selective exposure, in order to solidify replenished building material above the bottom plate within a contour prescribed by the control unit.

Such a device can be constructed in a very compact manner by accommodating the exposure unit in a cylindrical lower housing section which forms an extension of the cylinder, whereas the suspension of the piston and the drive motor and the control unit may be accommodated in an upper housing section at the opposite end which forms an extension of the cylinder. As a container with building material a cartridge may be located laterally at the cylinder and may be connected to the supply line of the cylinder. In such a design the footprint needed for the device can be limited to the cross-sectional area of the cylinder.

The cylinder is a vertical cylinder, i.e. the cylinder axis and the shell surface are oriented perpendicularly to the end faces. Preferably the cylinder is a circular cylinder. It is noted that the geometrical definition of the cylinder in connection with the present invention relates to the inner space of the cylinder. Insofar as the wall thickness of the cylinder shell is constant also the external shape is cylindrical. In principle it is also contemplated that a cylindrical hollow space could be formed in an elongated cubic housing body or in any other prismshaped body or housing, wherein such a body would also be a "cylinder" in the sense of the invention, in which cylinder a piston is slidably guided.

In a preferred embodiment the piston is, on the side facing away from the bottom plate, connected to a piston rod having an external thread which engages an internal thread in a component which is fixed relative to the cylinder. The piston rod has a recess which extends centred along the longitudinal axis of the piston rod and which is not rotationally symmetric; the recess may for example be rectangular or in any other manner polygonal. In this recess a drive pin is slidably introduced, which drive pin has a cross-sectional shape complementary to the recess such that engagement with positive fit with respect to rotational movements of the drive pin in the recess is realized, whereas the drive pin is free to move in axial longitudinal direction in the recess. The drive pin can be driven by the drive motor to rotate about its longitudinal axis, whereby the piston rod and the piston are rotated such that the external thread of the piston rod is rotated in the internal thread of the fixed component in order to thereby move the piston relative to the bottom plate, wherein at the same time the drive pin is shifted in the recess of the piston rod in its longitudinal direction. The recess of the piston rod can for example have a cross-sectional shape like the recess of a recessed head screw (Allen Screw), and the drive pin may have a complementary hexagonal shape as a corresponding hexwrench (Allen Key). During movement of the piston away from the bottom plate which is accompanied by corresponding movement of the piston rod, the drive pin is shifted relative to the recess of the piston rod further into the recess.

In a preferred embodiment the container is formed by a cartridge and the conveying device is formed as a cartridge piston which can be driven to be shifted and which, when controlled by the control unit to be shifted, presses building material out of the cartridge, through the supply line and into the cylinder.

At the supply line preferably a valve is provided which is configured to be able to open or block the supply line, for example if another building material is to be used or if cleaning liquid is to be directed into the building space, to thereby prevent that building material in the cartridge is contaminated. When pressing out unused building material, the building material, as long it is not contaminated by another material, should be pressed through the same supply line back again into the cartridge to recycle it for the next building job.

In a preferred embodiment a plurality of cartridges is located distributed around the circumference of the cylinder, wherein each cartridge is connected to a supply line leading to the cylinder and is selectively controllable by the control unit in order to press building material out of the respective cartridge and into the cylinder. An additional discharge line may serve to discharge mixed building materials or cleaning liquid.

In a preferred embodiment the bottom plate is configured such that the surface facing the interior of the cylinder releases agents acting as inhibitors which prevent or minimize sticking of the solidifying layer to the surface of the bottom plate facing the interior of the cylinder.

US 20150360419, which US published application is hereby incorporated by reference in entirety, is directed to a stereolithography device comprising a tank, which tank is made of a material which has a certain oxygen permeability. Oxygen acts in this case as inhibitor which forms a reaction inert thin intermediate layer which reduces sticking of the solidifying layer to the tank surface. As oxygen permeable materials Teflon AF and fluoro-polymers are mentioned as examples.

In a preferred embodiment the bottom plate consists of a nanoporous material in which inhibitor agents are accumulated and/or through which inhibitor agents diffuse and may pass through the bottom plate such that they are released on the surface of the bottom plate and prevent sticking of the polymerizing building material during the solidification.

In a preferred embodiment a chamber is formed on the side of the bottom plate facing away from the interior of the cylinder such that this chamber may be filled with a transparent inhibitor agent, for example a gas. In a preferred embodiment excess pressure may be applied to the chamber filled with the inhibitor agent in order to press the inhibitor agent into and through the nanoporous material.

From DE 10 2013 215 040 A1 and corresponding U.S. 2015034007, which US published application is hereby incorporated by reference in entirety, are directed to a stereolithography device which comprises at a base a semipermeable film covering a hollow space into which inhibitors are supplied. The use of semipermeable films and the supply of inhibitors to prevent sticking after the photopolymerization are also described in U.S. Pat. No. 5,122,441 B1, which is hereby incorporated by reference in entirety.

Nanoporous materials through which inhibitors may diffuse, to prevent sticking, are likewise described in the already mentioned document DE 10 2013 215 040 A1, U.S. 2015034007 and in U.S. 2017/0151718 A1, which US published applications are hereby incorporated by reference in entirety.

In a preferred embodiment the surface of the bottom plate facing the interior of the cylinder is coated with a superamphiphobic layer which minimizes sticking of the solidifying layer to the bottom plate. Superamphiphobic surfaces have the properties that they are phobic or repellent for both water and for oils. Such layers are described for example in the Articles "Glas, das sick selbst reinigt—Superamphiphobe Beschichtungen", Doris Vollmer, Max-Planck-Society, Yearbook 2013, and "Superamphiphobic Surfaces", Zonglin Chu et al., Chemical Society Reviews, Issue 8, 2014.

BRIEF DESCRIPTION OF THE DRAWINGS

The invention will in the following be described with reference to embodiments in the drawings in which.

DETAILED DESCRIPTION

Figure 6:
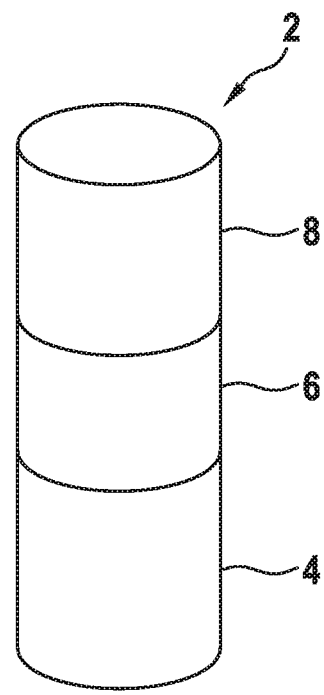
FIG. 6 is a schematic perspective external view of a device for carrying out the method according to the invention.

FIG. 6 shows a schematic and perspective external view of a housing of a device for carrying out the method according to the invention, wherein ports and lines for energy and material supply are omitted to simplify the representation. The cylindrical housing 2 of the device is in axial direction of the cylindrical shape divided into three sections 4, 6, and 8. In the lower section 4 the exposure unit is located. The exposure unit is configured for exposing a large number of picture elements in a predefined exposure field. The exposure unit includes for example a light source and a spatial light modulator, wherein the effective surface of the spatial light modulator is illuminated by the light source. The spatial light modulator comprises a matrix of exposing elements. The spatial light modulator may for example be a so called micromirror device; a micromirror device is understood to be a chip on which a large number of micromirror actuators are arranged as an array. Each micromirror actuator is individually and selectively controlled by a control unit to selectively switch it between an exposure position in which the associated micromirror reflects light from the light source to the associated picture element, and a dark position, in which the micromirror deflects the light from the light source to an inactive area. By periodically tilting the micromirror using a duty cycle which is selectively set for each exposing element, the generated average exposure intensity for the associated picture element can be set according to the duty cycle of the pulse width modulation.

The middle section 6 accommodates the actual building space in which the shaped body is built up. The design of the device in the interior of the middle section 6 will be described in more detail further below with the reference to FIGS. 1 to 5.

In the upper section 8 the drive motor is accommodated among other components, which drive motor drives a piston which is displaceable in the middle section 6 as will be described in more detail below.

The design of the device components in the middle section 6 is now explained in more detail with reference to FIG. 1. The middle section 6 includes a cylinder 10. The open lower end face of the cylinder 10 is closed by a transparent bottom plate 12. Above the bottom plate 12 and in axial direction adjacent thereto a supply line 14 leads to the interior of the cylinder 10.

In the interior of the cylinder 10 a piston 16 is slidably guided, which piston comprises piston rod 18. The piston rod 18 is among a major part of its longitudinal extension provided with an external thread 20 which is screwed into an internal thread which is formed on an inner wall of a central opening of a cover 22 which closes the end face of the cylinder 10 opposite to the bottom plate 12. The cover 22 is fixed by screws 24 to the cylinder 10. The fixation is required to ensure that the internal thread of the cover 22 is stationary when the piston rod 20 is driven to rotate about its longitudinal axis, and so that the rotating movement of the piston rod 18 is translated into a defined translatory movement of the piston rod 18 and the piston 16. On the other hand, the fixation of the cover to the cylinder 10 should be releasable, as in the present case by unscrewing the screws 24, so that after completion of the building process the fixation may be released and thereafter the piston and the piston rod with the cover 22 in engagement on the piston rod may be pulled of the cylinder, in order to take out the shaped body which is adhered to the front face of the piston 16.

Figure 7:
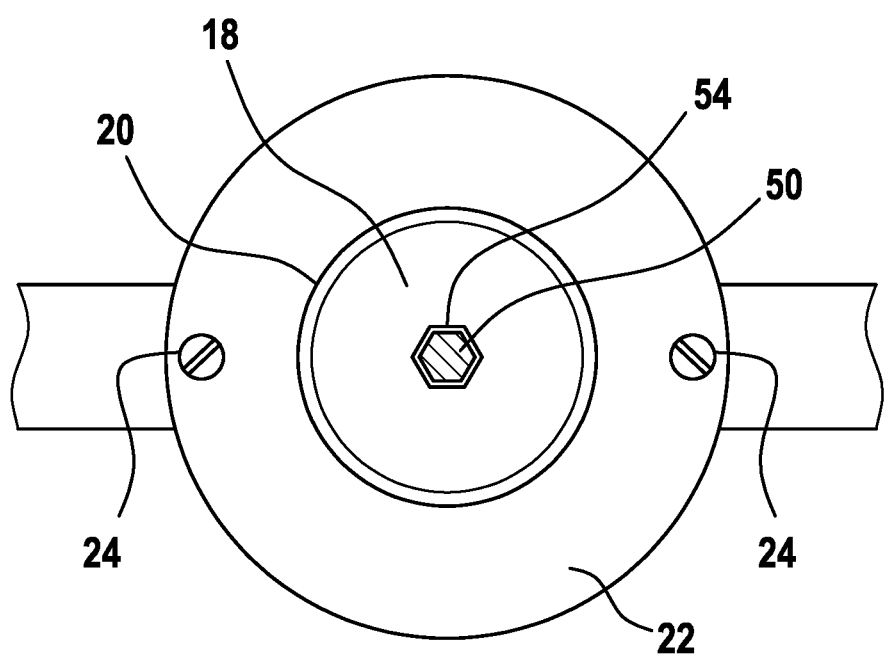
FIG. 7 is a top plan view of FIG. 1.

A schematically shown drive motor 52 acts on the piston rod 18 in order to rotate it in predetermined rotating steps about its longitudinal axis which, by the thread engagement of the piston rod 18 in the cover 22, causes an axial movement step of the piston 16. To put it more precisely, the drive motor 52 drives the drive pin 50 to rotate, which drive pin is received in a recess centred on the longitudinal axis of the piston rod 18. FIG. 7 shows the drive pin 50 and the recess 54 in the piston rod 18 have complementary cross-sectional shapes which are non-circular such that in rotational direction of the piston rod 18 about its longitudinal axis there is a positive engagement of drive pin 50 and piston rod 18. The recess and the drive pin may for example have a hexagonal or other polygonal cross-sectional shapes which provide a form-locking engagement in rotational direction, whereas the drive pin 50 is slidably moveable in the direction of the longitudinal axis of the piston rod such that upon rotation of the piston rod 18 driven by drive motor 52 and upon the resulting translatory movement of the piston 16 and piston rod 18 away from the bottom plate 12 the drive pin 50 moves relatively to the piston rod and moves further into the recess. To simplify the representations the drive motor 52 and the drive pin 50 are omitted in the following FIGS. 2 to 5.

Figure 1:
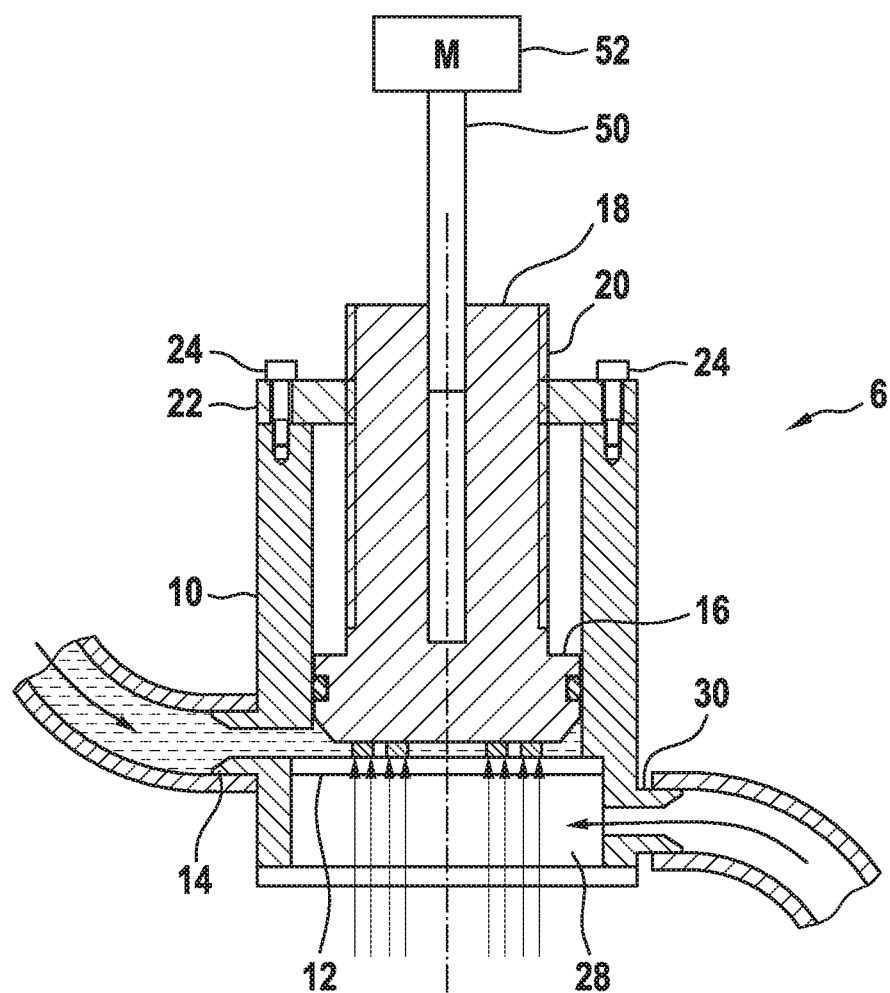
FIG. 1 is a cross-sectional view of a relevant portion of a device configured to carry out the method according to the invention.

FIG. 1 shows a state in an early phase of the building process of a shaped body. At the beginning of the building process the front surface of the piston 16 facing the bottom plate 12 is in abutment on the facing surface of the bottom plate 12. For exposing a first layer of photopolymerizable material the piston 16 is driven by the drive motor to perform a rotating step about its longitudinal axis which is set by a control unit, wherein the rotating angle of the rotating step is predefined in such a manner that the rotation about the rotating angle effects an axial displacement of the piston 16 away from the bottom plate 12 such that the front face of the piston 16 is spaced apart from the facing surface of the bottom plate 12 by the desired predetermined layer thickness. Simultaneously with movement of the piston 16 away from the bottom plate 12 building material is conveyed through the supply line 14 such that the additional volume, created by the movement of the piston 16 away from the bottom plate 12, between the front face of the piston 16 and the facing surface of the bottom plate 12 is filled with building material. After a layer with the desired layer thickness has been created between the front face of the piston 16 and the facing surface of the bottom plate 12 in this manner, the exposure of layer areas within the predetermined contour for this layer is now following in order to solidify these layer areas by exposure. The exposure of the first layer shown in FIG. 1 serves to solidify attachment structures shaped as pins which connect the shaped body to be built to the front face of the piston 16 which has the function of the building platform.

Figure 2:
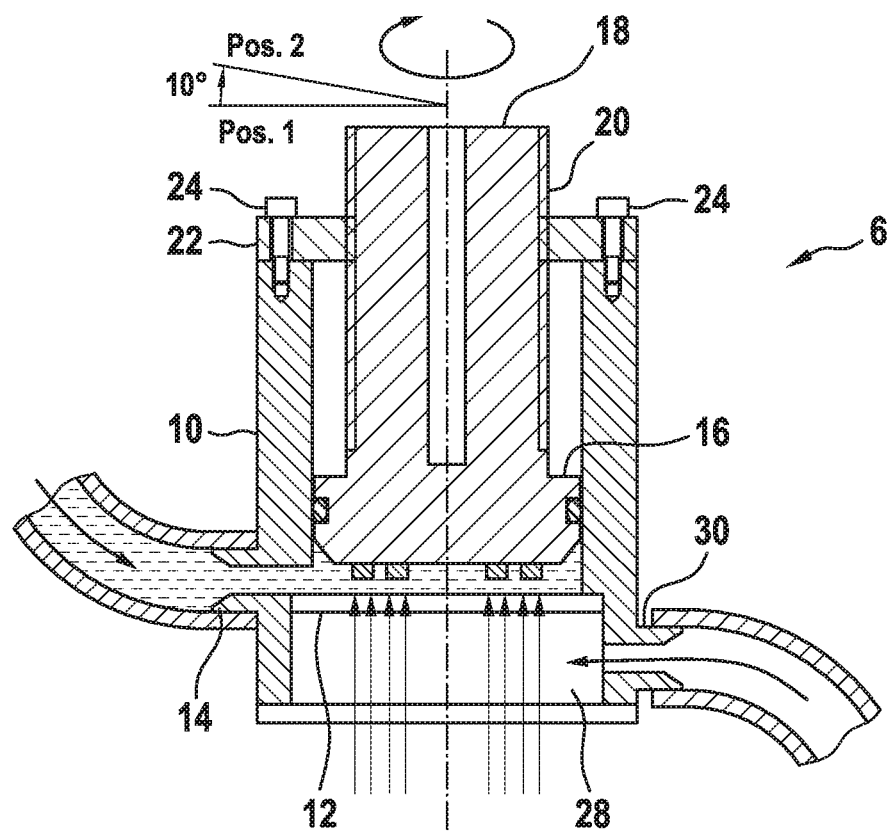
FIG. 2 is a cross-sectional view as in FIG. 1 in a subsequent step of the method.
Figure 2:
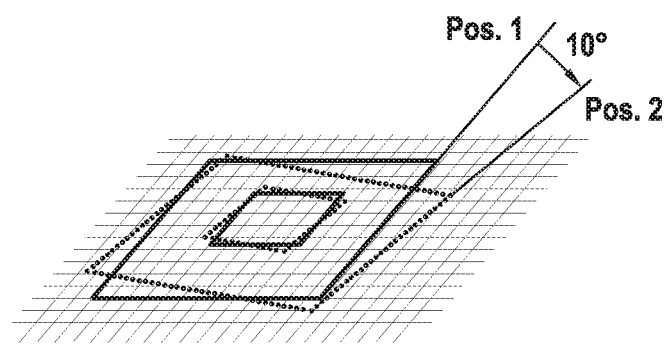

After exposure of the first layer the piston 16 is, for creating a further layer of building material, moved a further layer thickness away from the facing surface of the bottom plate 12, and simultaneously building material is replenished through the supply line 14. The result of this operation is shown in FIG. 2. The movement of the piston 16 is effected by rotating the piston rod 18 about its longitudinal axis in a rotating step by a rotating angle of 10°. The rotating angle is predetermined such that for this rotating angle and the given thread pitch of the threads of the piston rod 18 and the internal thread of the cover 22 effect the axial displacement of the front face of the piston 16 away from the bottom plate is equal to the desired layer thickness. The additional volume space being created during the movement of the piston 16 away from the facing surface of the bottom plate 12 is filled up by simultaneously replenishing building material through the supply line 14. Thereafter the exposure step for the second layer follows. In this connection it is taken into account that the solidified exposed layer areas of the first layer have been rotated by the rotating angle of 10° as a result of the rotation of the piston 16 such that the exposure areas of the second, now to be exposed layer areas have correspondingly to be rotated by 10° so that they are correctly positioned relatively to the solidified layer areas of the first layer. This relative rotation is illustrated in the lower part of FIG. 2 where it is shown how a layer area (square with open inner square), which is shown as an example for the first solidified layer area, is positioned after the rotation of the piston 16 by the predetermined rotating angle of 10° rotated relative to the coordinate system of the exposure unit, wherein the rotated positioning is illustrated by the dotted lines. The control unit controlling the exposure unit has to take into account this relative rotation so that the next layer to be solidified is then solidified in layer areas which are correctly positioned in the rotational position relative to the preceding solidified layer. This can be performed by a calculation operation which rotates the next to be solidified layer areas by the rotating step and thereby tracks the last solidified layer area. The exposure unit itself remains in its position and orientation unchanged, and only the contour of the corresponding layer area is rotated.

Figure 3:
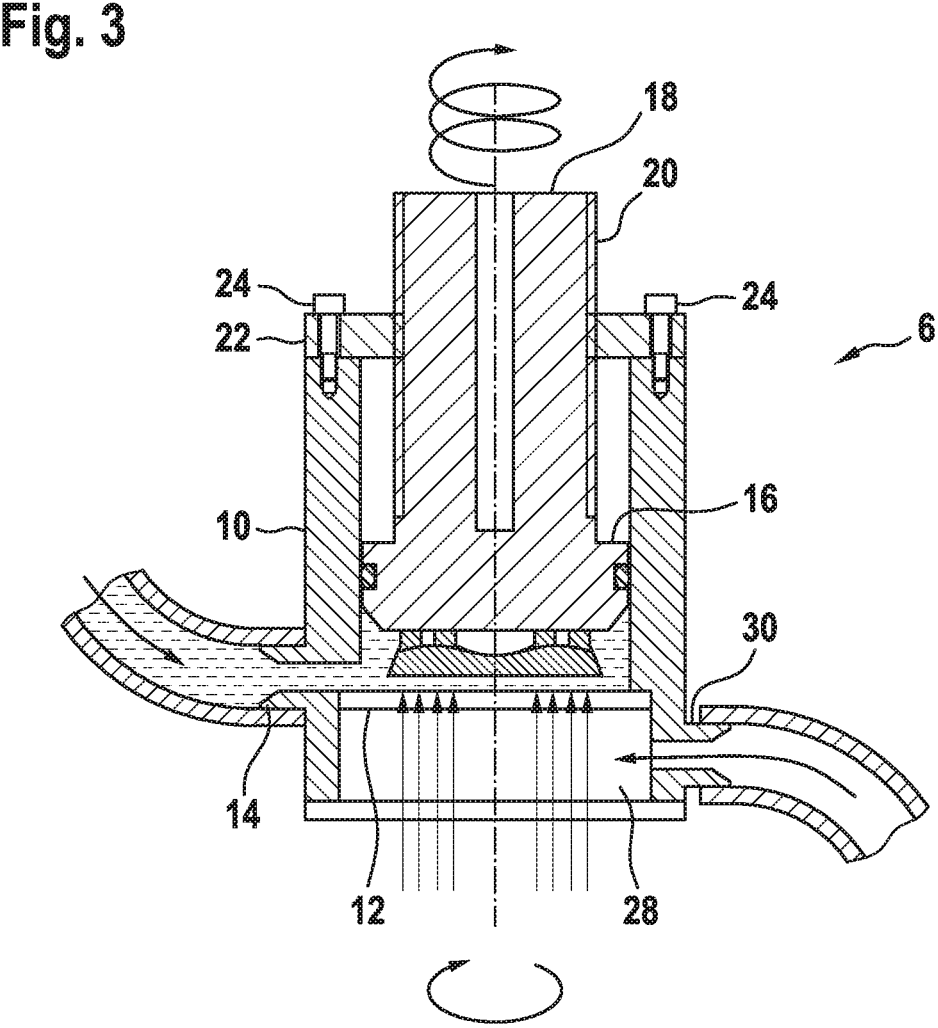
FIG. 3 is a cross-sectional view as in FIGS. 1 and 2 in a further advanced state of the method.

FIG. 3 shows the device in an intermediate phase of the building process when already several layers have been formed successively and have been solidified in exposure areas with respectively predefined contour such that already part of the shaped body is built up. The piston has already been moved away from the facing surface of the bottom plate 12 several times, each time in a step of a layer thickness. In the last step the piston has performed a further rotation by 10° in order to move away from the facing surface of the bottom plate 12 a further layer thickness, wherein simultaneously with this movement building material has been replenished through the supply line 14 in order to keep filled the additional volume being created by the movement in the building space.

The curved arrow shown below in FIG. 3 is supposed to illustrate that the control of the exposure unit has to take into account the accumulated rotating angle since the first exposure so that the currently to be exposed layer is with its exposure areas in the correct rotational position with respect to the preceding exposure areas. To put it differently, the coordinate system in which the shape or contour data of the layer areas to be solidified for the current layer are also rotated according to the accumulated rotation of the piston such that a correspondingly rotated image of the exposure area is exposed above the bottom plate 12.

FIG. 3 also shows that the building space enclosed by the bottom plate 12, the cylinder 10, and the piston 16 is successively, layer thickness by layer thickness, growing together with the shaped body during the building process.

Figure 4A:
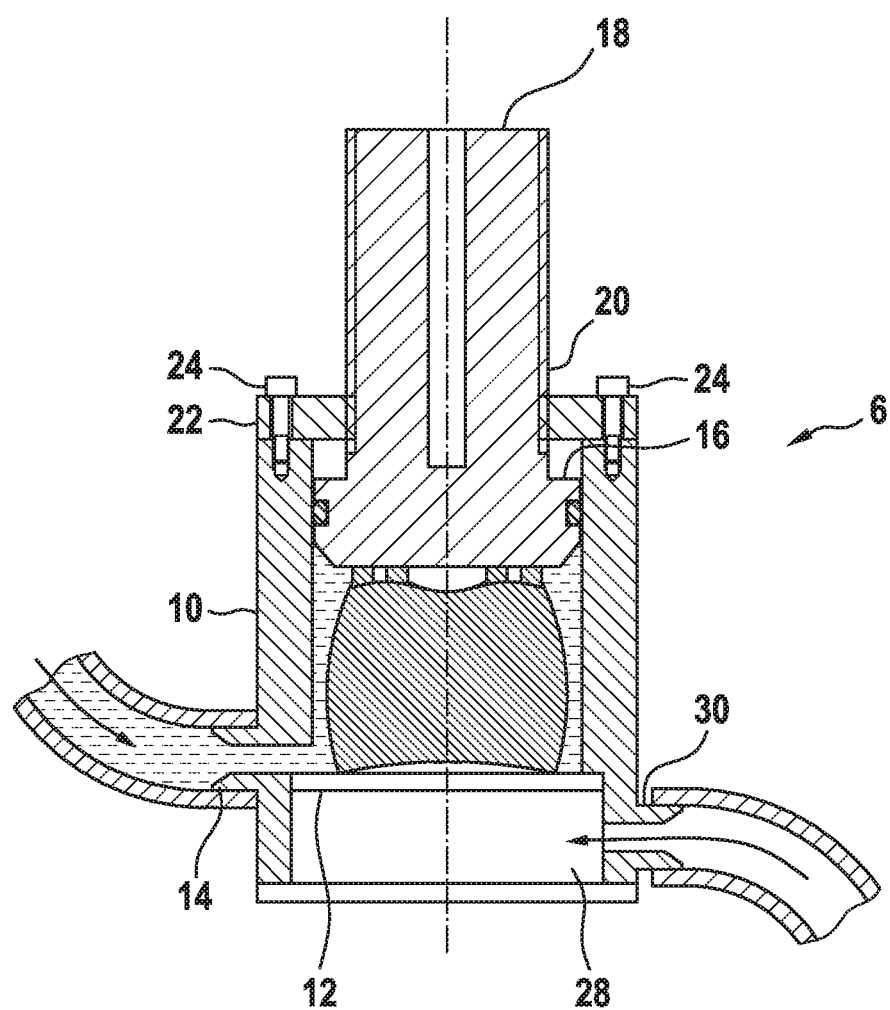
FIG. 4a is a cross-sectional view as in the preceding Figures in a final state of the building process for building a shaped body.
Figure 4B:
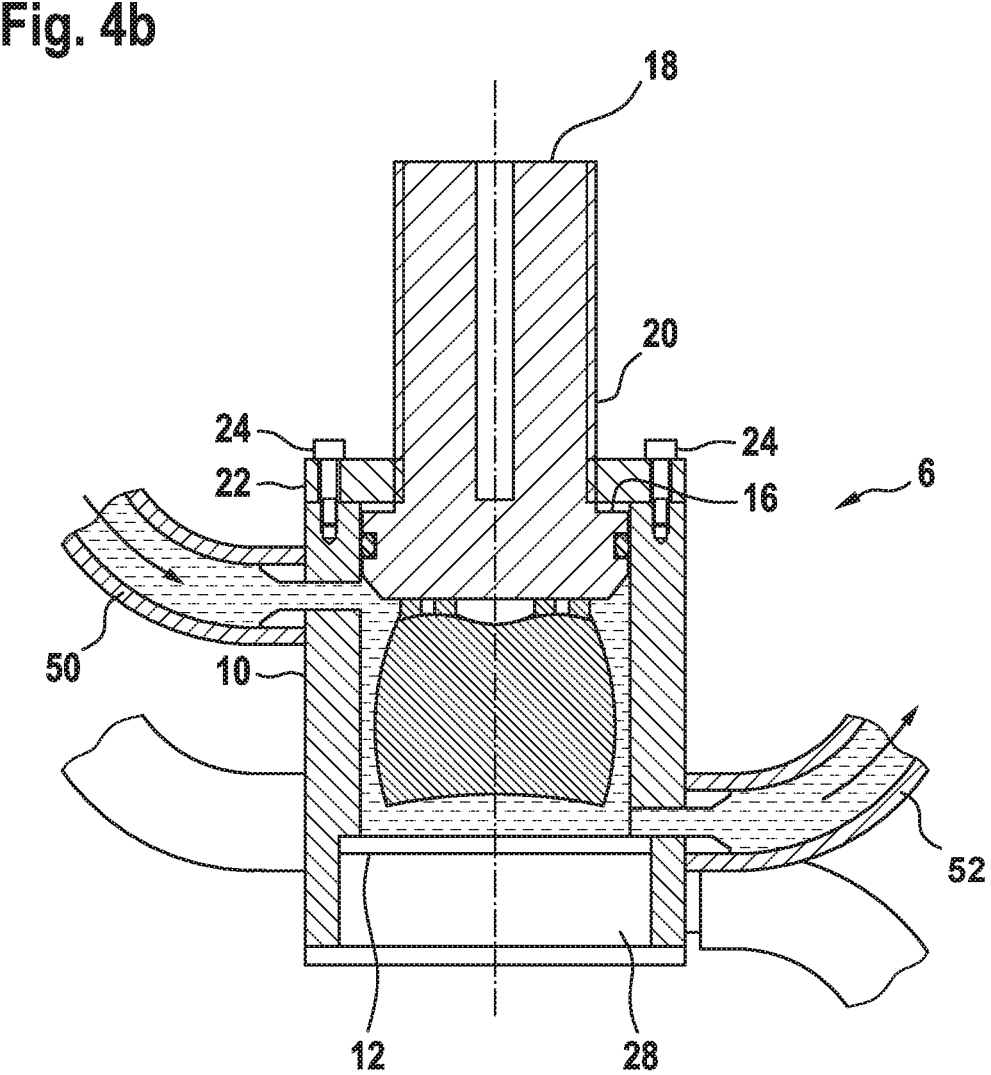
FIG. 4b is a cross-sectional view taken in a plane which is, compared to FIG. 4a, rotated about the cylinder axis, in which cross-section an additional input port and output port for cleaning liquid are visible in cross-section.

FIG. 4a shows the building process in a final phase when the last layer of the shaped body built, in this case an artificial tooth, has been exposed. After completion of the last exposure non-used, unpolymerized building material can be removed from the cylinder by directing pressurized air through a port (not shown) to the interior of the cylinder, whereby any remaining unpolymerized building material is pressed through the supply line out of the interior of the cylinder and back again in the associated building material cartridge. Thereafter any remaining residual monomer still adhering to the built shaped body can be removed by introducing cleaning liquid to the interior of the cylinder, as is shown in FIG. 4b which shows a cross-section taken in a plane which is, compared to the plane of the cross-section of FIG. 4a, rotated about the cylinder axis, wherein in this cross-section a supply line 50 and a discharge line 52 for cleaning liquid are shown in cross-section. In this final phase the piston is moved upwards to a level such that the piston already passed by the inlet opening for the cleaning liquid so that the inlet opening of the supply line 50 is open and leads to the interior of the cylinder. After the cleaning process and after opening the cover 22 the shaped body adhering to the piston 16 can be taken out. If the building material is, as in the current case, a slurry filled with ceramic particles for building a dental restoration, the shaped body taken out of the cylinder is then subjected to further processing steps, namely debinding and thereafter sintering for further densification of the ceramic shaped body.

In FIGS. 1 to 4 the supply line 14 is shown connected to a tube, but the container and the conveying device for conveying building material into the supply line 14 has been omitted for simplifying the representation.

Figure 5:
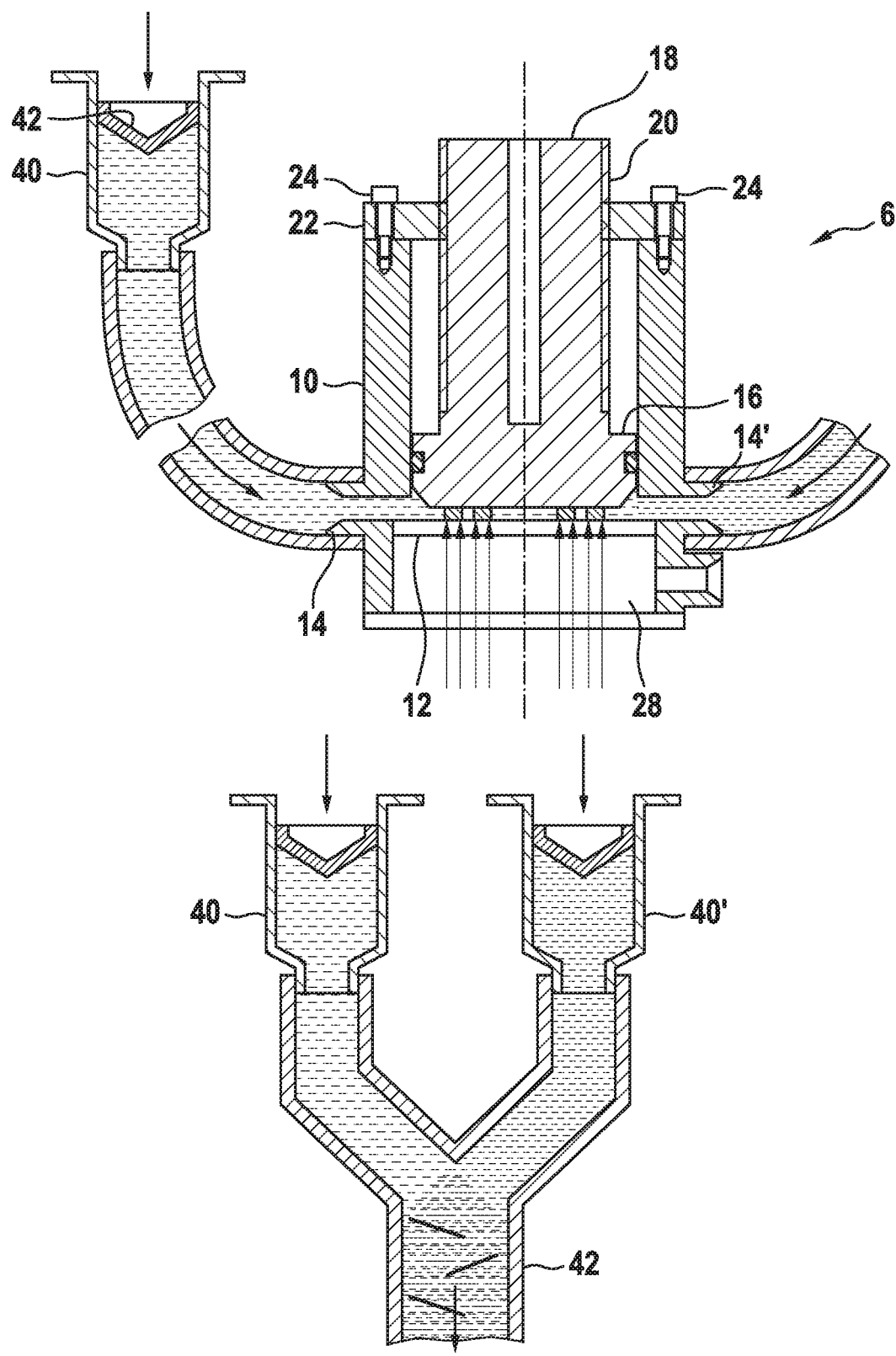
FIG. 5 is a cross-sectional view as in the preceding Figures of an extended device as well as a cross-sectional view of a detail of a collecting pipe for building materials.

In FIG. 5 a container 40 is shown which holds a supply of building material. In this example the container 40 is configured as a cartridge in which a cartridge piston or plug is located. A controllable drive acts on the cartridge piston 42 in order push the cartridge piston 42 in a controlled manner further into the interior of the cartridge to thereby convey building material out of the cartridge into the connected tube, and eventually into the supply line 12 and the interior of the cylinder 10. The controllable drive which acts on the cartridge piston 42 may for example be a step motor which acts via a displaceable tooth rack on the cartridge piston 42. Alternatively, pressure may be exerted on the cartridge piston 42 hydraulically or pneumatically in order to push the cartridge piston into the interior of the cartridge and to convey building material in this manner.

In FIG. 5 an embodiment is shown which compared to FIGS. 1 to 4 is upgraded for alternative embodiments of the method, namely the device comprises a second supply line 14' to which a further cartridge is connected in order to replenish building material selectively from one of the two cartridges or from both cartridges simultaneously, wherein in different cartridges supplies of different building material compositions are held. In this manner, for each layer to be created different building material compositions can be replenished and in this manner the material composition can be varied over the built shaped body. As an alternative for conveying different building material compositions into the interior of the cylinder via different supply lines 14, 14', several containers 40, 40' can be connected to a common collecting pipe which then leads to the supply line 14. At the entrance of this connecting pipe mixing elements may be arranged which provide for a thorow mixture of the building material compositions supplied from different cartridges.

Furthermore, in FIGS. 1 to 5 a chamber 28 is shown which is located underneath the bottom plate 12. A port 30 permits to connect a tube for conveying material into the chamber 28. This embodiment relates to a bottom plate 12 which permits inhibitors to pass through, which inhibitors prevent or minimize adherence of solidifying building material to the surface of the bottom plate 12 facing the interior of the cylinder 10. The bottom plate 12 may for example be made of a nanoporous material. Gaseous inhibitors may be pumped under pressure through the port 30 into the chamber 28 so that they are pressed through the nanoporous plate 12 and are released on the surface of the bottom plate 12 facing the interior of the cylinder 10 which prevents adherence of building material there. In this manner the piston 16 can, after exposure of an exposure area and solidification of the last solidified layer areas, be moved away from the bottom plate 12 without adhering thereto. The separation of the last solidified layer area from the bottom plate is in addition supported by the combined rotary and axial movement of piston 16 as described in connection with the embodiment of FIGS. 1 to 5, since in this manner there is also a movement component of the surface of the last solidified layer area transverse to the surface of the bottom plate 12.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A device, comprising
a cylinder (10) wherein one of the end faces of the cylinder is closed by a bottom plate which is at least in a central area transparent, and wherein in the cylinder a piston (16) is guided to be displaceable by a drive motor in the longitudinal direction of the cylinder such that the cylinder (10), the piston (16) and the bottom plate (12) define a closed building space having a variable volume in the interior of the cylinder (10);
a container holding building material which is connected to a supply line which, adjacently to the inner surface of the bottom plate opens into the interior of the cylinder (10), and a conveying device for conveying the building material from the container (40) through the supply line (14) into the interior of the cylinder (10);

an exposure unit which is configured for spatially selective exposure through the bottom plate; and a control unit which is arranged to control a drive motor (52) of the piston and the conveying device so as to fill the additional space created by the movement of the piston away from the bottom plate with building material, and which is arranged to control the exposure unit for spatially selective exposure in order to solidify replenished building material above the bottom plate within a contour prescribed by the control unit;

wherein the piston is on the side facing away from the bottom plate (12) provided with a piston rod having an external thread (20) which engages an internal thread in a component (22) fixed relative to the cylinder, wherein the piston rod has a central recess (54) which is non-circular, in which recess a complementary shaped drive pin (50) is slidably introduced, and wherein the drive pin (50) is drivable by the drive motor (52) to rotate about its longitudinal axis, whereby the piston rod (18) and the piston (16) are likewise rotated, whereby the external thread of the piston rod (18) is rotated in the internal thread of the fixed component (22) to move the piston (16) relative to the base plate (12), wherein the drive pin (50) is shifted in the recess of the piston rod.

2. The device according to claim 1,
wherein the container (40) is formed as a cartridge and the conveying device is formed as a cartridge piston (42) which can be pushed forward by a drive, which cartridge piston when pushed forward under the control of the control unit presses building material out of the cartridge, through the supply line (14) into the cylinder (10).

3. The device according to claim 1,
wherein the supply line (14) is equipped with a valve which is configured to be controlled by the control unit to keep the supply line open or to block it.

4. The device according to claim 2,
wherein there is a plurality of supply lines (14, 14') which are arranged circumferentially distributed around the cylinder and adjacent to the base plate.

5. The device according to claim 1,
wherein the bottom plate (12) is formed in such a manner that the surface of the bottom plate facing the interior of the cylinder (10) releases agents acting as inhibitors which minimize adhering of the solidified layer to the surface of the bottom plate (12) facing the interior of the cylinder.

6. The device according to claim 5,
wherein the bottom plate (12) comprises a nanoporous material in which inhibitor agents are accumulated and from which these agents are released and/or through which inhibitor agents can defuse and pass the bottom plate (12).

7. The device according to claim 6,
wherein on the side of the bottom plate (12) facing away from the interior of the cylinder a chamber (28) is formed which is fillable with a transparent inhibitor agent through a supply line (30).

8. The device according to claim 1,
wherein the surface of the bottom plate facing the interior of the cylinder is coated with a super amphiphobic layer which further minimizes adhering of the solidified layer to the bottom plate.

* * * * *